United States Patent [19]

Robinson

[11] Patent Number: 4,544,118
[45] Date of Patent: Oct. 1, 1985

[54] DRIVE MECHANISM FOR COMBINED FLAP-AILERON SURFACE

[75] Inventor: Curtiss W. Robinson, Seattle, Wash.

[73] Assignee: The Boeing Company, Seattle, Wash.

[21] Appl. No.: 431,759

[22] Filed: Sep. 30, 1982

[51] Int. Cl.⁴ .......................... B64C 9/06; B64C 9/18
[52] U.S. Cl. .................................. 244/225; 244/215; 244/90 R
[58] Field of Search ............... 244/211, 212, 213, 214, 244/215, 216, 217, 90 R, 225

[56] References Cited

U.S. PATENT DOCUMENTS

| | | | |
|---|---|---|---|
| 2,086,085 | 7/1937 | Lachmann et al. | 244/216 |
| 2,158,676 | 5/1939 | Engelhardt | 244/216 |
| 2,174,422 | 9/1939 | Laddon et al. | 244/215 |
| 2,222,435 | 11/1940 | Ksoll | 244/217 |
| 2,222,935 | 11/1940 | Chilton | 244/215 |
| 2,276,688 | 3/1942 | Dewoitine | 244/216 |
| 2,289,704 | 7/1942 | Grant | 244/216 |
| 2,352,074 | 6/1944 | Brown et al. | 244/216 |
| 2,373,365 | 4/1945 | Westberg | 244/216 |
| 2,407,401 | 9/1946 | Clauser et al. | 244/225 |
| 2,445,833 | 7/1948 | Kraemer et al. | 244/216 |
| 2,479,619 | 8/1949 | Hilton et al. | 244/216 |
| 2,501,726 | 3/1950 | Knox | 244/216 |
| 2,516,406 | 7/1950 | Moyer | 244/216 |
| 2,563,453 | 8/1951 | Briend | 244/216 |
| 2,583,405 | 1/1952 | Youngman | 244/225 |
| 3,655,149 | 4/1972 | Williams | 244/225 |
| 3,853,289 | 12/1974 | Nevermann et al. | 244/215 |
| 3,985,319 | 10/1976 | Dean et al. | 244/216 |
| 4,248,395 | 2/1981 | Cole | 244/216 |

FOREIGN PATENT DOCUMENTS

| | | | |
|---|---|---|---|
| 748431 | 4/1944 | Fed. Rep. of Germany | 244/214 |
| 503908 | 4/1939 | United Kingdom | 244/225 |
| 1496518 | 12/1977 | United Kingdom | 244/213 |
| 2003098 | 3/1979 | United Kingdom | 244/215 |

Primary Examiner—Trygve M. Blix
Assistant Examiner—Rodney Corl
Attorney, Agent, or Firm—Delbert J. Barnard

[57] ABSTRACT

A flap (22) carries a guide roller (24) at each of its ends. Each guide roller (24) travels within a fore and aft track (28) positioned immediately endwise outwardly of its end of the flap (22). The flap (22) is extended and retracted by means including a reaction link (36) and a two-way linear actuator (38). The actuator (38) and the reaction link (36) are pivotally connected at their forward ends to the outer end of a bell crank arm (34), for pivotal movement about a common axis (40). At its rearward end the actuator (38) is pivotally attached to the flap at a location (44) offset above the roller (24). The reaction link (36) is pivotally attached at its rearward end to the flap (22) at a location (42) offset below the roller (24). Rotation of the bell crank arm (34) alone will result in the flap (22) being translated rearwardly and rotated downwardly, i.e. Fowler flap movement. Extension or retraction of the actuator (38) will cause a rotation of the flap (22) about the axes (26) of the rollers (24).

27 Claims, 5 Drawing Figures

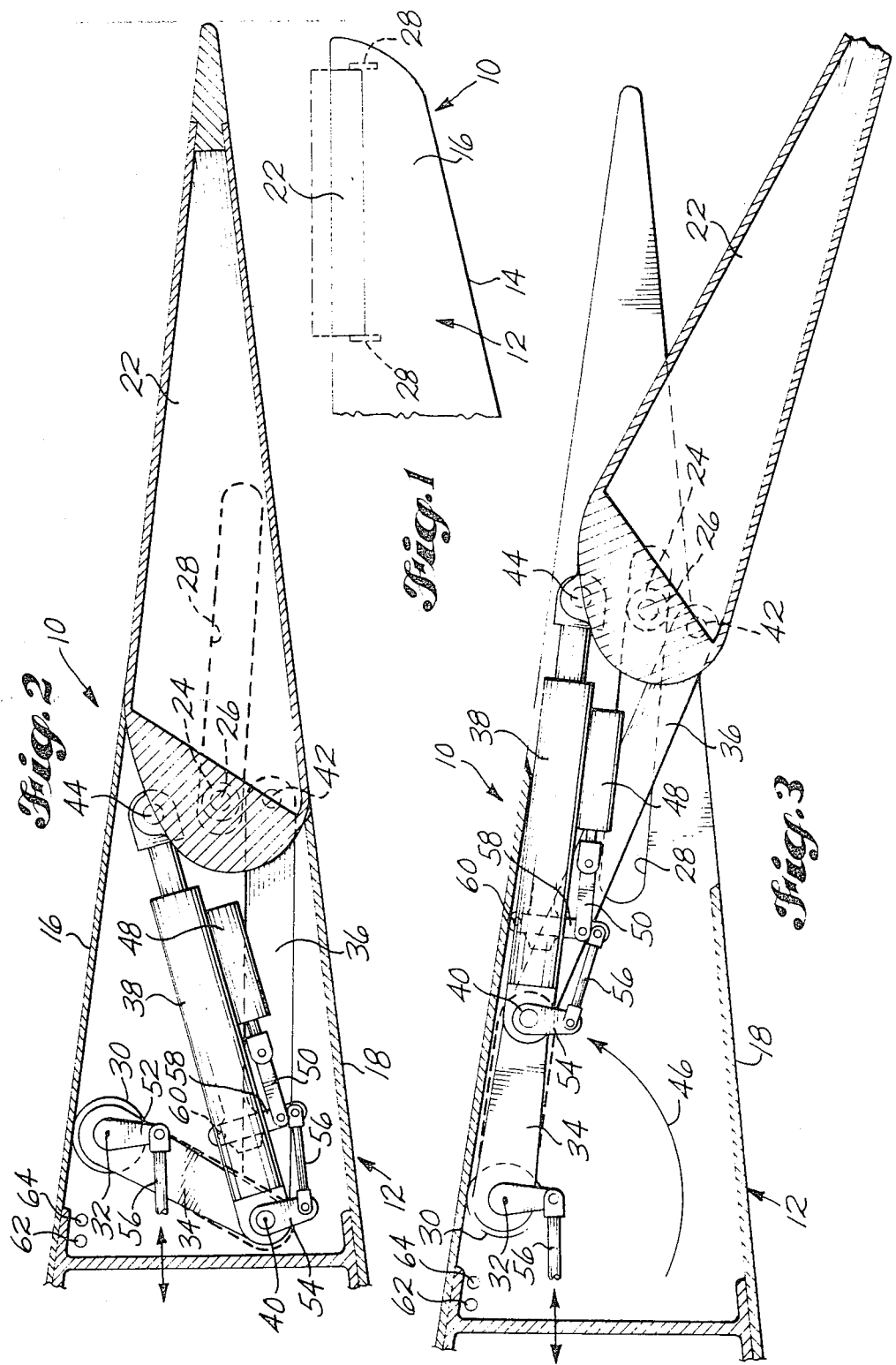

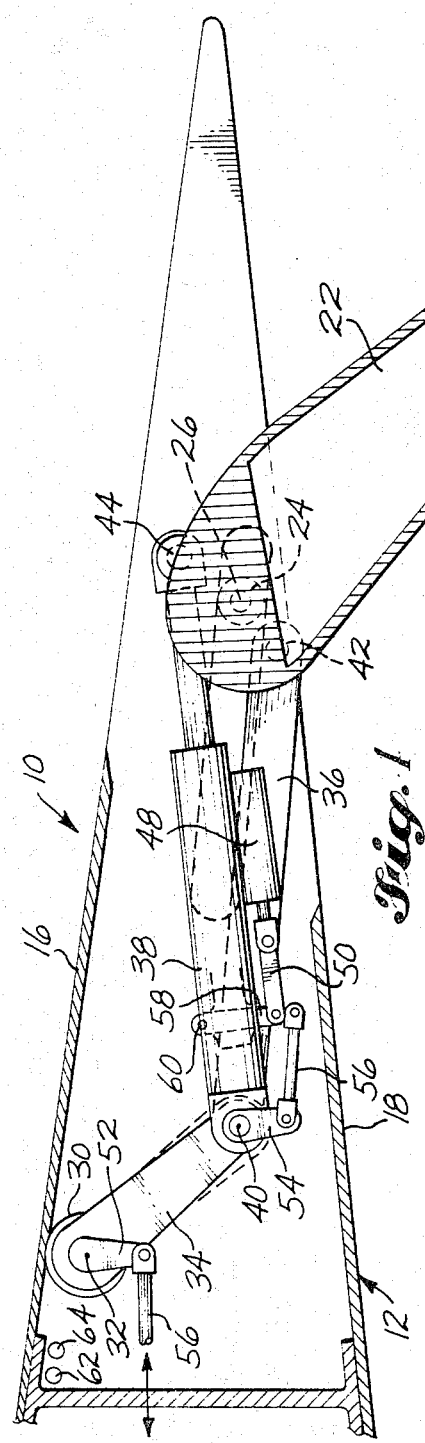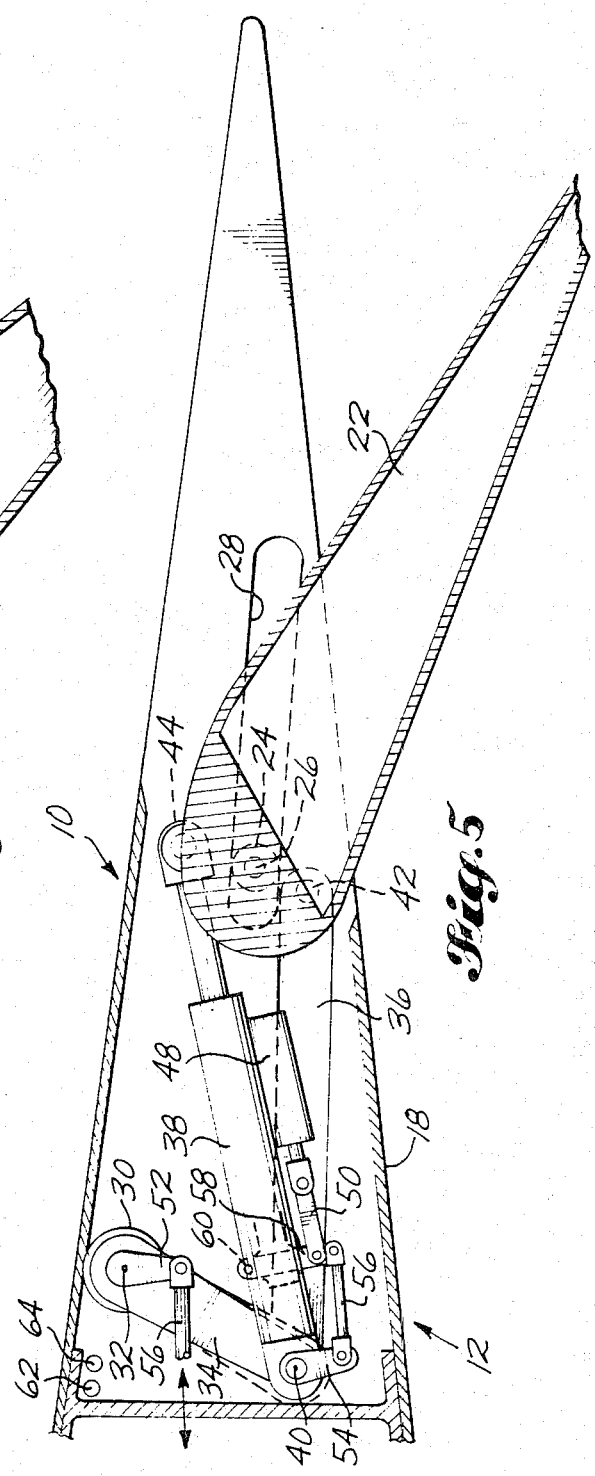

4,544,118

DRIVE MECHANISM FOR COMBINED FLAP-AILERON SURFACE

TECHNICAL FIELD

The present invention relates to a mechanism for mounting flaps onto the trailing edge of an airplane wing and for actuating such flaps to shift them rearwardly from the main wing structure and to independently alter their angle of incidence relative to the main wing structure.

BACKGROUND ART

Existing transport aircraft use multiple slotted trailing edge wing flaps. The operating mechanism for such flap arrays requires the use of external fairings on the lower wing surfaces. These fairings cause major drag forces during flaps-up operation which penalizes the aircrafts operating economy. An example of an existing multiple slotted wing flap mechanism is disclosed by U.S. Pat. No. 3,853,289, granted Dec. 10, 1974, to Carroll H. Nevermann and Ellis J. Roscow.

Where full span trailing edge wing flaps are used it is convenient to employ the outboard flap segments in a dual mode of motion so that these surfaces can be used as Fowler flaps and also as low speed ailerons.

Flap segment hinge points and flap track or linkage devices mounted below the lower wing skin are two schemes in common use to implement the suspension of multi-segment Fowler type flaps with large deflection angle capability. These devices although useful for flap suspension, do not facilitate the use of the rearward trailing edge flap element as an aileron.

Fowler flaps do not merely rotate relative to the wing body about a hinge connection. They move between a retracted position in which they are a part of the wing and an extended position in which they are both spaced from and at an angle with respect to the wing body. A Fowler flap which could also function as an aileron would have to have the ability to rotate about a pivot axis at each of its flap positions.

Examples of single slotted flap mechanisms are disclosed by the following U.S. patents: U.S. Pat. No. 2,158,676, granted May 16, 1939, to Lloyd F. Englehardt; U.S. Pat. No. 2,352,074, granted June 20, 1944, to Dayton T. Brown and Charles G. Layman; U.S. Pat. No. 2,373,365, granted Apr. 10, 1945, to A. Harold Westberg; U.S. Pat. No. 2,445,833, granted July 27, 1948, to Robert W. Kraemer, Thomas C. Hill and Willem D. van Zelm; U.S. Pat. No. 2,479,619, granted Aug. 23, 1949, to Lewis M. Hilton and Herbert E. Chaplin; U.S. Pat. No. 2,501,726, granted Mar. 28, 1950, to Thomas Knox; U.S. Pat. No. 2,516,406, granted July 25, 1950, to Edward L. Moyer; and U.S. Pat. No. 2,563,453, granted Aug. 7, 1951, to Paul Briend.

Examples of multiple slotted trailing edge wing flaps which may be found in the patent literature are shown by the following U.S. patents: U.S. Pat. No. 2,222,435, granted Nov. 19, 1940, to Joseph Ksoll; U.S. Pat. No. 2,276,688, granted Mar. 17, 1942, to Emile J. E. Dewoitine; U.S. Pat. No. 2,289,704, granted July 14, 1942, to Charles H. Grant; U.S. Pat. No. 3,853,289, granted Dec. 10, 1974, to Carroll H. Nevermann and Ellis J. Roscow; U.S. Pat. No. 3,985,319, granted Oct. 12, 1976, to Roy D. Dean and Richard H. Weiland and U.S. Pat. No. 4,248,395, granted Feb. 3, 1981, to James B. Cole.

DISCLOSURE OF THE INVENTION

A principal object of the present invention is to provide a single slotted Fowler flap mechanism incorporating an independent aileron degree of freedom.

Another object of the invention is to provide a flap supporting and guiding mechanism which requires only one pair of flap tracks which are mounted on a forward wing structure outwardly of the two ends of the flap. The flap tracks are mounted totally within the wing and require no structure or fairing outside of the wing skin envelope.

In preferred form, a fixed track is built into a forward wing structure (e.g. the main wing body) immediately outwardly of each end of a flap. Each track extends generally fore and aft of the forward wing structure. Each end of the flap carries a guide means which engages its track and mounts its end of the flap for movement along the track. In accordance with an aspect of the invention, the guide means have axes coinciding with the hinge axis of the flap and they mount the flap for rotation about its hinge axis.

In preferred form, the positioning means comprises a torque tube having a bell crank with a first end connected to the torque tube and a second end spaced radially outwardly from the torque tube. A reaction link is pivotally connected at a first end to the second end of the bell crank and is pivotally connected at a second end to the flap at a location offset below the pivot axis. A double-acting hydraulic cylinder is pivotally connected at a first end to the second end of the bell crank, on a common axis with the reaction link, and is pivotally connected at a second end to the flap at a location offset above the pivot axis. When the flap is in its forward or retracted position the hydraulic cylinder is centered. The arrangement of the track structure and the positioning means is such that bell crank rotation in the rearward direction will result in both rearward translation and a slight amount of downward rotation of the flap. Coordinated rotation of the bell crank and extension or retraction of the hydraulic cylinder will rotate the flap about its hinge axis. This can be done at any of the flap positions.

Other more detailed features of the invention are described in the description of the preferred embodiment and are particularly pointed out in the appended claims.

BRIEF DESCRIPTION OF THE DRAWINGS

In the drawings, like element designations refer to like parts throughout, and

FIG. 1 is a fragmented top plan view of an aircraft wing;

FIG. 2 is a sectional view showing the flap mounting and positioning structure as it appears when the flap is retracted;

FIG. 3 is a view like FIG. 2, but showing the flap extended;

FIG. 4 is a view like FIGS. 2 and 3, but showing the flap both partially extended and deflected downwardly; and FIG. 5 is a view like FIGS. 2-4, but showing the flap deflected downwardly while retracted.

BEST MODE FOR CARRYING OUT THE INVENTION

Referring to FIGS. 1 and 2, an aircraft wing 10 is shown to comprise a main wing structure 12 having a forward edge surface 14, an upper surface 16 and a lower surface 18. Wing 10 also includes an inboard flap 20 and an outboard flap 22.

The outboard flap 22 carries a trunnion-like structure at each of its ends. In the illustrated embodiment, this structure includes a roller 24, the axis 26 of which constitutes the swing or pivot axis of the flap 22.

The main wing structure 12 carries a pair of tracks 28, positioned immediately endwise outwardly from the ends of the flap 22. Tracks 28 extend in the fore and aft direction. In the illustrated embodiment, each track 28 comprises upper and lower, spaced apart rails between which a roller 24 is received. The orientation of the track 28 establishes the path of travel of the roller 24 during extension and retraction of the flap 22. The exact shape and/or orientation of the track can be different in other installations.

A torque tube 30 is positioned within the main wing structure 12, forwardly and upwardly of the track 28. Torque tube 30 is suitably mounted for rotation about an axis 32. A bell crank arm 34 is connected at one end to the torque tube 30 and at its opposite end it is pivotally connected to the forward ends of a reaction link 36 and a linear actuator, e.g. a double-acting hydraulic cylinder 38 or equivalent electrical extensible actuator. The bell crank arm 34, the reaction link 36 and the hydraulic cylinder 38 are connected together for pivotal movement about a common axis 40. The opposite or rear end of the reaction link 36 is pivotally attached to a lower forward portion of the flap 22, for pivotal movement about an axis 42, offset from and positioned below the axis 26. The second or rearward end of the hydraulic cylinder 38 is pivotally attached to an upper forward portion of the flap 22, for pivotal movememt about an axis 44, offset from and positioned above the axis 26.

In FIGS. 2 and 3, the hydraulic cylinder 38 is shown in a centered position. This means that the cylinder 38 can be both extended and retracted from the position shown.

Counterclockwise rotation of the torque tube 30 will cause the arm 34 to swing rearwardly along an arc 46. Rearward rotation of the arm 34, until the arm 34 is aligned with the still centered cylinder 38, will cause both a rearward translation and slight downward rotation of the flap 22. The reaction link 36 and the centered cylinder 38 are pushed rearwardly by the swinging arm 34. Together they push the flap 22 rearwardly. The guide tracks 28 determine the direction of movement of the rollers 24.

Comparing FIGS. 2–5, the flap 22 can be deflected downwardly by an extension of the cylinder 38.

The flap 22 rotates about the axis 26. There is some travel of the roller along the track and the position of pivot axis 44 is moved rearwardly. There is some vertical movement of pivot axis 42 to accommodate movement of the roller along the track.

As shown by FIGS. 2–5, the guide tracks 28 and the positioning elements 34, 36, 38 are all located totally within the wing and require no structure or fairing outside of the wing skin envelope.

As is known per se, the torque tube 30 may comprise a small diameter high speed inner tube surrounded by a low speed tube to which the arm 34 is attached, with a suitable gear reduction being provided between the two tubes.

The control system for the hydraulic cylinder 38 may comprise a servo valve 48 attached to the body of cylinder 38, as shown. Servo valve 48 is of conventional construction and includes a reciprocating port control member including a rod portion 50 and mechanism for moving rod 50 endwise to a center position or one or the other of a pair of opposite end positions. When the port member is in its center position, flow is blocked both into and outfrom the two chambers within cylinder 38. When the movable element is in a first end position, one of the cylinder chambers is connected to system pressure and the other is connected to return pressure. When the port control member is in its opposite position, the connection of the chambers to supply and return are reversed.

A mechanical signal to drive the control rod 50 may be transmitted through the geometry of the flap-actuating toggle link by the use of a pantograph linkage or equivalent chain drive, shown somewhat schematically in FIG. 2. The pantograph drive is basically like the drive system that is built into a conventional drafting machine. It operates to maintain levers 52, 54 in a constant position with respect to each other during swinging movement of the bell crank arm 34. As a result, pivotal movement of bell arm 34 will not by itself cause any movement of the control rod 50.

Control lever 52 is suitably mounted for rotation about an axis which coincides with the axis of torque tube 30. It is mounted to be swung fore and aft by a mechanical signal applied through a control member 56. A drive is provided between lever 52 and 54 which results in lever 54 being moved the same amount as lever 52 in response to a movement of lever 52. The outer end of control element 50 is pivotally attached to a link 58 which is at its opposite end pivotally attached to the actuator rod, for rotation about an axis 60. Link 58 is parallel to lever 54 and the two are connected by a connection rod 56. Connection rod 56 is pivotally attached at its opposite ends to the lever 54 and the link 58. This parallel linkage results in a swinging movement of lever 54, causing an endwise axial movement of control member 50. As mentioned above, a movement of lever 52 by means of a mechanical input signal applied through member 56 causes a corresponding movement of lever 54. As lever 54 swings rearwardly, it pushes on rod 56, swinging link 58 rearwardly. This moves valve control 50 rearwardly and moves the valve port control member towards one of its end positions. When lever 54 is swung forwardly, it pulls on link 56, swinging link 58 forwardly. Valve control member 50 is pulled forwardly moving the port control member towards its opposite end position. Of course, other suitable mechanisms could be used for controlling the servo valve 48.

Supply and return pressure hoses 62, 64 may enter into the interior of the wing structure in the position shown. Hose loops (not shown) are used to connect the hydraulic pressure and return lines to a swivel (not shown) connected to the valve body.

Although the invention has been illustrated and described in connection with a single-slotted wing, it may have application in a multi-slotted wing as well. In such an installation, the flap-positioning elements and the guide track would be carried inside of a flap structure positioned immediately forwardly of the flap which is to be controlled by such mechanism. In some installations, it may be desirable to use an electrically driven two-way linear actuator in place of the double-acting cylinder.

The present invention has been described in relation to a preferred embodiment. One of ordinary skill in the art, after reading the foregoing specification, and studying the drawings, will be able to effect various changes, substitutions of equivalence and other alterations to the preferred embodiment without departing from the original concept of the invention. It is therefore intended that the invention disclosed above be limited only by the definition of the appended claims and the rules of claim interpretation, including application of the doctrine of equivalents.

What is claimed is:

1. In an aircraft:
a slotted wing comprising a main wing structure having upper, lower and forward edge skin surfaces and a rear recess, and a combination flap-aileron having upper and lower skin surfaces, a forward edge, and a hinge axis, said wing skin surfaces establishing a wing skin envelope;
fixed position track means carried by the main wing structure totally within the wing envelope, mounting said flap-aileron for fore and aft movement relative to the main wing structure, between a forward position in which the forward edge of the flap-aileron is received within the recess and a rearward position in which said forward edge is spaced rearwardly of the recess; and
positioning means for said flap-aileron operable for driving the flap-aileron fore and aft along said fixed position track means, and for holding the flap-aileron in position at any location at or between the forward and rearward positions of the flap-aileron, and for rotating the flap-aileron about said hinge axis at any position of the flap-aileron along said track means, and for holding the flap-aileron in a selected rotational position within a range of rotational positions, wherein fore and aft movement of the flap-aileron along said fixed position track means and rotation of the flap-aileron about said hinge axis are each independent of the other.

2. In an aircraft:
a forward wing structure;
a rear edge flap having opposite ends;
a pair of fore and aft extending fixed tracks, one positioned immediately outwardly of each end of the flap, said tracks being carried by the forward wing structure;
guide means carried by each end of the flap, mounting its end of the flap for movement along the track means; and
flap positioning means comprising a torque tube supported within the main wing structure forwardly of said track means, a bell crank arm having a first end connected to the torque tube and a second end spaced radially outwardly from the torque tube, a reaction link pivotally connected at a first end to the second end of the bell crank arm and pivotally connected at a second end to the flap at a location offset below the pivot axis, and a two-way linear actuator having a first end which is pivotally connected to the second end of the bell crank arm, on a common axis with said reactive link, and a second end which is pivotally connected to the flap at a location offset above the pivot axis.

3. The structure of claim 2, wherein the two-way linear actuator is a double-acting hydraulic cylinder.

4. The structure of claim 3, wherein the flap has a forward neutral position and when it is in such position, the guide means occupy relatively forward positions on the fixed tracks, the bell crank arm extends at a slope downwardly and forwardly from the torque tube, and the hydraulic cylinder is centered.

5. The structure of claim 3, wherein the flap has an extended position in which it is spaced rearwardly from the main wing structure and is also rotated slightly downwardly from its attitude when in the forward neutral position, the guide means are positioned relatively forwardly on the fixed tracks, the bell crank arm and the hydraulic cylinder are substantially aligned, and the hydraulic cylinder is centered.

6. The structure of claim 2, wherein positioning means is operable for rotating the flap-aileron downwardly by extension of the linear actuator.

7. The structure of claim 2, wherein the positioning means is operable for rotating the flap-aileron upwardly by retraction of the linear actuator.

8. In an aircraft:
a slotted wing comprising a main wing structure having upper, lower and forward edge skin surfaces and a rear recess, and a combination flap-aileron having upper and lower skin surfaces, a forward edge, and a hinge axis, said wing skin surfaces establishing a wing skin envelope;
track means carried by the main wing structure, mounting said flap-aileron for fore and aft movement relative to the main wing structure, between a forward position in which the forward edge of the flap-aileron is received within the recess and a rearward position in which said forward edge is spaced rearwardly of the recess; and
positioning means operable for (a) drivingly moving the flap-aileron fore and aft along said track means, and for holding the flap-aileron in a selected position along said track means, and (b) rotating the flap-aileron about said hinge axis, and for holding the flap-aileron in a selected rotational position, said movement of the flap-aileron along said track means being independent of rotation of the flap-aileron about said hinge axis, the flap-aileron being rotatable at any position of the flap-aileron fore and aft along said track means, and further, the flap-aileron being movable along said track means for any rotational position of the flap-aileron within a selected range of rotational positions,
wherein the track means and the positioning means are located totally within the wing envelope, and
wherein the flap-aileron comprises opposite ends and the track means comprises a pair of fixed tracks, one positioned immediately outwardly of each end of the flap-aileron, and guide means carried by each end of the flap-aileron, mounting its end of the flap-aileron for movement along the track means.

9. The structure of claim 8, wherein each fixed track has spaced apart upper and lower rails, and wherein the guide means carried by the ends of the flap-aileron are positioned between the rails.

10. The structure of claim 9, wherein the guide means have axes coinciding with the hinge axis and they mount the flap-aileron for rotation about the hinge axis.

11. The structure of claim 10, wherein the guide means are rollers.

12. The structure of claim 11, wherein the positioning means comprises a torque tube, a bell crank having a first end connected to the torque tube and a second end spaced radially outwardly from the torque tube, a reaction link pivotally connected at a first end to the second end of the bell crank and pivotally connected at a second end to the flap-aileron at a location offset below the pivot axis, and a two-way linear actuator having a first end which is pivotally connected to the second end of the bell crank, on a common axis with said reaction link, and a second end which is pivotally connected to the flap-aileron at a location offset above the pivot axis.

13. The structure of claim 12, wherein the two-way linear actuator is a double-acting hydraulic cylinder.

14. The structure of claim 10, wherein the positioning means comprises a torque tube, a bell crank having a first end connected to the torque tube and a second end spaced radially outwardly from the torque tube, a reaction link pivotally connected at one end to the second end of the bell crank and pivotally connected at a second end to the flap-aileron at a location offset below the pivot axis, and a two-way linear actuator having a first end which is pivotally connected to the second end of the bell crank, on a common axis with said reaction link, and a second end which is pivotally connected to the flap-aileron at a location offset above the pivot axis.

15. The structure of claim 14, wherein the two-way linear actuator is a double-acting hydraulic cylinder.

16. The structure of claim 15, wherein the hydraulic cylinder is centered when the flap-aileron is in its forward position.

17. The structure of claim 16, wherein the track means and the positioning means function to both translate and rotate the flap-aileron downwardly upon bell crank rotation in a direction moving the flap-aileron from its forward position to its rearward position.

18. The structure of claim 17, wherein the track means and the positioning means are operable for rotating the flap-aileron downwardly by extension of the hydraulic cylinder.

19. The structure of claim 17, wherein the track means and the positioning means are operable for rotating the flap-aileron upwardly by retraction of the hydraulic cylinder.

20. In an aircraft:
a slotted wing comprising a main wing structure having upper, lower and forward edge skin surfaces and a rear recess, and a combination flap-aileron having opposite ends and a guide means carried by each of said ends, said flap-aileron further having upper and lower skin surfaces, a forward edge, and a hinge axis, said wing skin surfaces establishing a wing skin envelope;
track means in the form of a pair of fixed tracks, one each of said pair being positioned immediately outwardly of each end of the flap-aileron, each of said fixed tracks having spaced apart upper and lower rails carried by the main wing structure, with the guide means carried by each end of the flap-ailerons being positioned between the rails for mounting each end of the flap-aileron for movement along the track means, for fore and aft movement relative to the main wing structure between a forward position in which the forward edge of the flap-aileron is received within the recess and a rearward position in which said forward edge is spaced rearwardly of the recess, and wherein said guide means have axes coinciding with the hinge axis such that they mount the flap-aileron for rotation about the hinge axis; and
positioning means comprising a torque tube, a bell crank haing a first end connected to the torque tube and a second end spaced radially outwardly from the torque tube, a reaction link pivotally connected at one end to the second end of the bell crank and pivotally connected at a second end to the flap-aileron at a location offset below the pivot axis, and a two-way linear actuator having a first end which is pivotally connected to the second end of the bell crank, on a common axis with said reaction link, and a second end which is pivotally connected to the flap-aileron at a location offset above the pivot axis, said positioning means being operable for:
(a) driving the flap-aileron fore and aft along said track, (b) rotating the flap-aileron about the hinge axis, and (c) holding the flap-aileron in a selected position,
wherein the track means and the positioning means are located totally within the wing skin envelope.

21. The structure of claim 20, wherein the two-way linear actuator is a double-acting hydraulic cylinder.

22. The structure of claim 21, wherein the hydraulic cylinder is centered when the flap-aileron is in its forward position.

23. The structure of claim 22, wherein the track means and the positioning means function to both translate and rotate the flap-aileron downwardly upon bell crank rotation in a direction moving the flap-aileron from its forward position to its rearward position.

24. The structure of claim 23, wherein the track means and the positioning means are operable for rotating the flap-aileron downwardly by extension of the hydraulic cylinder.

25. The structure of claim 23, wherein the track means and the positioning means are operable for rotating the flap-aileron upwardly by retraction of the hydraulic cylinder.

26. In an aircraft:
a slotted wing comprising a main wing structure having upper, lower and forward edge skin surfaces and a rear recess, and a combination flap-aileron having opposite ends and guide means in the form of a roller carried by each of said ends, said flap-aileron further having upper and lower skin surfaces, a forward edge, and a hinge axis, said wing skin surfaces establishing a wing skin envelope;
track means in the form of a pair of fixed tracks, one each of said pair being positioned immediately outwardly of each end of the flap-aileron, each of said fixed tracks having spaced apart upper and lower rails carried by the main wing structure, with the roller carried by each end of the flap-aileron being positioned between the rails of that track which is positioned immediately outwardly of its end, for mounting its end for movement along the track, for fore and aft movement relative to the main wing structure between a forward position in which the forward edge of the flap-aileron is received within the recess and a rearward position in which said forward edge is spaced rearwardly of the recess, and wherein each roller has an axis coinciding with the hinge axis such that the rollers carried at the ends of the flap-aileron mount the flap-aileron for rotation about the hinge axis; and
positioning means operable for (a) driving the flap-aileron fore and aft along said fixed tracks, (b) rotating the flap-aileron about the hinge axis, and (c) holding the flap-aileron in a selected position, said positioning means comprising:
a torque tube, a bell crank having a first end connected to the torque tube and a second end spaced radially outwardly from the torque tube, a reaction link pivotally connected at a first end to the second end of the bell crank and pivotally connected at a second end to the flap-aileron at a location offset below the pivot axis, and a two-way linear actuator having a first end which is pivotally connected to the second end of the bell crank, on a common axis with said reaction link, and a second end which is pivotally connected to the flap-aileron at a location offset above the pivot axis, wherein the track means and the positioning means are located totally within the wing skin envelope.

27. The structure of claim 26, wherein the two-way linear actuator is a double-acting hydraulic cylinder.

* * * * *